US011975865B2

(12) United States Patent
Hessling-Von Heimendahl et al.

(10) Patent No.: US 11,975,865 B2
(45) Date of Patent: May 7, 2024

(54) AIRCRAFT PASSENGER CABIN LIGHT, AIRCRAFT PASSENGER CABIN LIGHTING SYSTEM, AND METHOD OF INSTALLING AN AIRCRAFT PASSENGER CABIN LIGHTING SYSTEM

(71) Applicant: Goodrich Lighting Systems Gmbh & Co. KG, Lübeck (DE)

(72) Inventors: Andre Hessling-Von Heimendahl, Koblenz (DE); Marion Depta, Lippstadt (DE); Andreas Ueberschaer, Gütersloh (DE); Carsten Pawliczek, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/303,737

(22) Filed: Apr. 20, 2023

(65) Prior Publication Data
US 2023/0348097 A1 Nov. 2, 2023

(30) Foreign Application Priority Data
Apr. 27, 2022 (EP) ..................... 22170288

(51) Int. Cl.
*B64D 47/02* (2006.01)
*B60Q 3/44* (2017.01)
(Continued)

(52) U.S. Cl.
CPC .............. *B64D 47/02* (2013.01); *B60Q 3/44* (2017.02); *B64D 11/00* (2013.01);
(Continued)

(58) Field of Classification Search
CPC .... B64D 2011/0038; B64D 2011/0053; B60Q 3/43; B60Q 3/44; B60Q 3/46
See application file for complete search history.

(56) References Cited

U.S. PATENT DOCUMENTS 2,461,446 A * 2/1949 Schepmoes .............. B60Q 3/44
362/509
3,358,134 A * 12/1967 Gonyea .................... B60Q 3/44
362/543
(Continued)

FOREIGN PATENT DOCUMENTS

EP 3738877 A1 * 11/2020 ............... B60Q 3/43
JP 2013091472 A 5/2013

OTHER PUBLICATIONS

Abstract for JP2013091472 (A), Published: May 16, 2013, 1 page.
Extended European Search Report for Application No. 22170288.9, dated Sep. 27, 2022, 7 pages.

*Primary Examiner* — Alexander K Garlen
(74) *Attorney, Agent, or Firm* — CANTOR COLBURN LLP

(57) ABSTRACT

An aircraft passenger cabin light. The light has: an elongated shape having a longitudinal direction (L) comprises: a cabin wall illumination assembly, which extends along the longitudinal direction (L) of the aircraft passenger cabin light and which is configured for illuminating a portion of a wall of an aircraft passenger cabin; and a plurality of personal reading light units for providing personal reading light illumination to passengers. The plurality of personal reading light units are arranged in an array extending along the longitudinal direction (L) of the aircraft passenger cabin light Said array is arranged along the cabin wall illumination assembly.

17 Claims, 9 Drawing Sheets

(51) Int. Cl.
  *B64D 11/00* (2006.01)
  *F21W 106/00* (2018.01)
  *F21W 107/30* (2018.01)
  *F21S 8/02* (2006.01)

(52) U.S. Cl.
  CPC ........... *B64D 2011/0038* (2013.01); *B64D 2011/0053* (2013.01); *B64D 2203/00* (2013.01); *F21S 8/026* (2013.01); *F21W 2106/00* (2018.01); *F21W 2107/30* (2018.01)

(56) References Cited

U.S. PATENT DOCUMENTS

| | | |
|---|---|---|
| 5,647,658 A | 7/1997 | Ziadi |
| 7,597,286 B2 | 10/2009 | Callahan et al. |
| 9,365,291 B2 | 6/2016 | Savian |
| 9,487,296 B2 | 11/2016 | Freund et al. |
| 9,789,962 B2 | 10/2017 | Ehlers et al. |
| 2006/0237585 A1* | 10/2006 | Lau ............... B64D 11/003 244/118.5 |
| 2010/0012780 A1* | 1/2010 | Kohlmeier-Beckmann ............... B64D 11/00 244/118.5 |
| 2012/0012707 A1* | 1/2012 | Schliwa ........... B64D 11/003 224/539 |
| 2013/0286673 A1* | 10/2013 | Umlauft ............ B64D 13/06 454/73 |
| 2014/0112014 A1* | 4/2014 | Lin ..................... B60Q 3/47 362/520 |
| 2014/0169012 A1* | 6/2014 | Ehlers .............. B64D 11/00 362/470 |
| 2020/0043307 A1* | 2/2020 | Lapujade ........... G08B 7/062 |

\* cited by examiner

AIRCRAFT PASSENGER CABIN LIGHT, AIRCRAFT PASSENGER CABIN LIGHTING SYSTEM, AND METHOD OF INSTALLING AN AIRCRAFT PASSENGER CABIN LIGHTING SYSTEM

CROSS-REFERENCE TO RELATED APPLICATIONS

This application claims priority to European Patent Application No. 22170288.9 filed Apr. 27, 2022, the entire contents of which is incorporated herein by reference.

TECHNICAL FIELD

The present invention is in the field of interior aircraft lights, in particular in the field of aircraft passenger cabin lights. The present invention is in particular related to an aircraft passenger cabin light, to an aircraft passenger cabin lighting system, and to a method of installing an aircraft passenger cabin lighting system.

BACKGROUND

Passenger aircraft, such as commercial airplanes, which comprise a passenger cabin with passenger seats, are usually equipped with general passenger cabin lights for illuminating the passenger cabin. Such passenger aircraft are usually further equipped with a plurality of individually switchable passenger reading lights. Each passenger reading light is assigned to one of the passenger seats for providing personal reading light illumination to a passenger sitting in said assigned passenger seat.

The passenger reading lights are usually installed in passenger service units, which are located above the passenger seats. Said passenger service units may comprise a plurality of functional components, such as at least one of a loudspeaker, a gasper, an emergency passenger oxygen supply system, a selectively illuminable visual sign, and/or a cabin service personnel switch for triggering a signal for calling cabin service personnel. Passenger reading lights contribute significantly to the weight, to the complexity and to the costs of the passenger service units.

It would be beneficial to improve the way of providing general passenger cabin illumination and individual passenger reading light illumination within the passenger cabin of an aircraft.

SUMMARY

Exemplary embodiments of the invention include an aircraft passenger cabin light, which has an elongated shape. The elongated shape has a longitudinal direction and a lateral direction, which is transverse to the longitudinal direction. When the aircraft passenger cabin light in installed within an aircraft passenger cabin, the longitudinal direction is oriented along the longitudinal direction of said aircraft passenger cabin.

The aircraft passenger cabin light comprises a cabin wall illumination assembly, which extends along the longitudinal direction of the aircraft passenger cabin light, and which is configured for illuminating a portion of a wall of the aircraft passenger cabin.

The aircraft passenger cabin light further comprises a plurality of personal reading light units for providing personal reading light illumination to passengers. The plurality of personal reading light units may be arranged in an array. The array may in particular be a row. The array extends along the longitudinal direction of the aircraft passenger cabin light and the personal reading light units are arranged along the cabin wall illumination assembly. The array of personal reading light units may be arranged next to, besides and/or adjacent the cabin wall illumination assembly. The array of personal reading light units may in particular be offset from the cabin wall illumination assembly in the lateral direction, which is transverse to the longitudinal direction.

An aircraft passenger cabin light according to an exemplary embodiment of the invention combines the functionality of a general passenger cabin light, which provides general illumination of the passenger cabin, with the functionalities of individually switchable passenger reading lights, which provide personal reading light illumination to passengers. In consequence, it may be possible that no personal reading lights need to be installed within the passenger service units. The weight and the complexity of the passenger service units may be reduced, and the passenger service units may be produced at lower costs without deteriorating the illumination within the passenger cabin.

In an embodiment, the aircraft passenger cabin light has a longitudinal extension, which extends in the longitudinal direction, and a transverse extension, which extends perpendicular to the longitudinal direction, and the transverse extension is smaller than the longitudinal extension. The transverse extension may in particular be smaller than 30%, more particularly smaller than 20%, or even smaller than 10% of the longitudinal extension.

In an embodiment, the longitudinal extension is in the range of between 254 mm (10 inches) and 1829 mm (72 inches), in particular in the range of between 254 mm (10 inches) and 914 mm (36 inches), and the transverse extension is in the range of between 25.4 mm (1 inch) and 76.2 mm (3 inches).

In an embodiment, the cabin wall illumination assembly comprises a plurality of wall illumination light sources. The wall illumination light sources may be arranged in an array, which extends along the longitudinal direction of the aircraft passenger cabin light. The array may in particular include at least one row of wall illumination light sources.

In an embodiment, the wall illumination light sources are LEDs or comprise LEDs. LEDs are highly efficient light sources and may be provided at low costs.

In an embodiment, all wall illumination light sources of the cabin wall illumination assembly emit light having the same color.

In an embodiment, the wall illumination light sources are dimmable. This may allow for adjusting the brightness of the light, which is emitted by the cabin wall illumination assembly.

In an embodiment, the cabin wall illumination assembly comprises different wall illumination light sources, which emit light having different colors. The wall illumination light sources may be individually switchable and/or dimmable. This may allow for selectively changing the color of the light, which is emitted by the cabin wall illumination assembly.

In an embodiment, the cabin wall illumination assembly comprises at least one reflector, which extends along the longitudinal direction of the aircraft passenger cabin light. The reflector may be configured for shaping the light output, which is emitted by the cabin wall illumination assembly, in a desired manner. The reflector may in particular be configured for directing the light output into a desired direction, more particularly for directing the light output towards the wall of the passenger cabin. The at least one reflector may have a parabolic shape or a spherical shape in cross-section.

In an embodiment, the at least one reflector extends along the array of wall illumination light sources, in particular along the longitudinal extension of the array of wall illumination light sources.

In an embodiment, the at least one reflector extends along a plurality of seat rows along the longitudinal direction of the passenger cabin.

In an embodiment, the cabin wall illumination assembly comprises two reflectors, or two reflector portions, wherein one of the two reflectors, or reflector portions, extends on each side of the wall illumination light sources, respectively. In other words, the array of wall illumination light sources may be arranged between two reflectors or two reflector portions, which are arranged facing each other and extending alongside each other along the longitudinal direction. Such a combination of two reflectors or reflector portions, which are arranged on both sides of the wall illumination light sources, may allow for a very efficient illumination of the wall of the passenger cabin.

In an embodiment, the wall illumination light sources are arranged in groups, with each group comprising at least two wall illumination light sources, respectively. Each group of wall illumination light sources may be provided with at least one reflector or at least one reflector portion, which is configured for forming the light output emitted by the wall illumination light sources of the respective group.

In an embodiment, the cabin wall illumination assembly comprises at least one light transmissive optical element, for example a prism or a lens, for forming the light output of the cabin wall illumination assembly. The at least one light transmissive optical element may in particular be a total internal reflection (TIR) light transmissive optical element.

In an embodiment, at least one light transmissive optical element is provided for and assigned to each of the wall illumination light sources, respectively. Each of the light transmissive optical elements may in particular be attached to and/or integrated with one the wall illumination light sources, respectively.

In an embodiment, at least one common light transmissive optical element is provided for and assigned to a plurality of wall illumination light sources. The wall illumination light sources may in particular be arranged in groups, with each group comprising at least two wall illumination light sources, and each group may be provided with at least one light transmissive optical element, which is configured for forming the light output emitted by the wall illumination light sources of the respective group.

In an embodiment, the cabin wall illumination assembly and the plurality of personal reading light units are arranged in a common elongated housing of the aircraft passenger cabin light. The elongated housing may in particular be a hollow profile, which extends in the longitudinal direction of the aircraft passenger cabin.

In an embodiment, the common elongated housing includes an at least partially light transmissive cover, which protects the components of the cabin wall illumination assembly from unauthorized access and/or mechanical influences and which allows light, which is emitted by the light sources, to exit from the housing.

In an embodiment, the plurality of personal reading light units are arranged in groups of personal reading light units, wherein each group of personal reading light units comprises at least two personal reading light units and wherein the groups of personal reading light units are spaced apart from each other along the longitudinal direction of the aircraft passenger cabin light. In particular, the groups of personal reading light units may have a larger spacing therebetween than the personal reading light units within the respective groups.

In an embodiment, each group of personal reading light units has two or three or four or five personal reading light units. In particular, each group of personal reading light units may have a number of personal reading light units that corresponds to the number of seats of an associated seat row.

In an embodiment, each of the personal reading light units comprises a reading light source and at least one optical element, such as a reflector and/or a lens. The at least one optical element may be arranged and configured to shape a personal reading light output from the light emitted by the respective reading light source.

With the spacing between the groups of personal reading light units, a desired trade-off between flexibility in providing reading light functionality and usage of lighting resources may be achieved. On the one hand, a small spacing between the groups of personal reading light units may provide a high level of flexibility in selecting a particular group of personal reading light units for a particular relative position between the aircraft passenger cabin light and a seat row. On the other hand, a larger spacing between the groups of personal reading light units may allow for a larger portion of reading light units to be assigned to passenger seats in any given configuration, leading to an overall higher usage ratio of the personal reading light units. In general, with more personal reading light units being provided per unit length than passenger seats per unit length of the aircraft passenger cabin, the passenger seats may be provided with reading light functionality in a highly targeted manner, without having to exactly match the positions of the aircraft passenger cabin lights and the positions of the seat rows. An over-capacity of personal reading light units may obviate the need for a high positioning accuracy of the aircraft passenger cabin lights for a particular seat configuration.

In an embodiment, the aircraft passenger cabin light further comprises at least one selectively illuminable visual sign and at least one additional function light source, which is configured for selectively illuminating the at least one selectively illuminable visual sign. The at least one selectively illuminable visual sign may be at least one of a non-smoking sign, a fasten-your-seatbelt sign, a switch-off-your-electronic-devices sign, and a fold-up-your-table sign.

In an embodiment, the aircraft passenger cabin light comprises a plurality of selectively illuminable visual signs and a plurality of associated additional function light sources. The aircraft passenger cabin light may in particular comprise an arbitrary combination or sub-combination of the above mentioned selectively illuminable visual signs. In other words, the combination of selectively illuminable visual signs does not need to include all of the above-mentioned signs. The combination may further comprise other selectively illuminable visual signs, which have not been explicitly mentioned.

Including at least one selectively illuminable visual sign into the aircraft passenger cabin light adds extra functionality to the aircraft passenger cabin light. In such a configuration, it is possible that there is no need for providing selectively illuminable visual signs at the passenger service units. As a result, the weight, the complexity, and the costs of the passenger service units may be reduced even further.

Exemplary embodiments of the invention further include an aircraft passenger cabin lighting system, which comprises: an aircraft passenger cabin light according to an exemplary embodiment of the invention and a plurality of reading light switches. Each of the plurality of reading light switches may be coupled with a particular one of the plurality of personal reading light units. This may allow for controlling the operation of a selected subset of the plurality of personal reading light units by switching the respectively coupled reading light switches. The additional features, modifications, and effects, as described herein with respect to exemplary embodiments of the aircraft passenger cabin light, apply to the aircraft passenger cabin lighting system in an analogous manner.

Exemplary embodiments of the invention also include a method of installing an aircraft passenger cabin lighting system according to an exemplary embodiment of the invention in an aircraft passenger cabin, which extends in a longitudinal direction of an aircraft, wherein the method includes: installing the aircraft passenger cabin light of the aircraft passenger cabin lighting system within the aircraft passenger cabin, so that the cabin wall illumination assembly extends along the longitudinal direction of the aircraft passenger cabin; installing at least one reading light switch at or in the vicinity of, in particular above, at least one passenger seat in the aircraft passenger cabin; and coupling each of the at least one reading light switch with a particular one of the plurality of personal reading light units of the aircraft passenger cabin light. This may allow for controlling the operation of one or more of the personal reading light units of the aircraft passenger cabin light by switching the at least one electrical reading light switch. The additional features, modifications, and effects, as described herein with respect to exemplary embodiments of the aircraft passenger cabin light and/or with respect to exemplary embodiments of the aircraft passenger cabin lighting system, apply to the method of installing an aircraft passenger cabin lighting system in an analogous manner.

In an embodiment, each of the plurality of reading light switches is assigned to a particular passenger seat and it is coupled with that particular personal reading light unit, which is arranged for providing personal reading light illumination to said particular passenger seat. This may allow passengers sitting on the passenger seats to conveniently activate and deactivate their personally associated reading light units by operating the reading light switch which is assigned to the respective passenger seat.

The reading light switches may be mechanical switches, which are configured to be operated manually by the passengers. The reading light switches also may be electromagnetic switches, such as relays, and/or electronic switches, such as semiconductor switches, which are configured to be switched by electric control signals, which are supplied to the switches. Switches that are controlled by electric control signals may allow for a remote control of the personal reading light units.

In an embodiment, the reading light switches comprise virtual switching elements, which may be switching symbols displayed on a screen, in particular a touch screen, and which may be operated by tapping on the screen.

In an embodiment, the aircraft passenger cabin lighting system further comprises at least one passenger service unit, and the plurality of reading light switches may be provided as components of the at least one passenger service unit.

In an embodiment, each of the at least one passenger service unit further comprises additional function components. These components may include at least one of a loudspeaker, a gasper, an emergency passenger oxygen supply system, a selectively illuminable visual sign, and/or a cabin service personnel switch for triggering a signal for calling cabin service personnel. Each of the at least one passenger service unit may comprise an arbitrary combination of these components or an arbitrary subset of these components.

In an embodiment, the aircraft passenger cabin lighting system comprises more personal reading light units than reading light switches. In such an embodiment, not every personal reading light unit is coupled with a reading light switch, and the non-coupled personal reading light units are deactivated.

Such an embodiment may allow for adapting the operation of the aircraft passenger cabin light to a particular seat configuration within the aircraft passenger cabin. In particular, such an embodiment may allow for adjusting the seat configuration within the passenger cabin, such as by changing the number and/or positions of the passenger seats, without replacing and/or moving the personal reading light units. The reading light configuration may be adjusted easily to a new seat configuration by modifying the assignment between the personal reading light units and the reading light switches, so that the reading light switches allow activating and deactivating the personal reading light units, which are assigned to the respective seats of the new seat configuration. In the case of a modification of the seat configuration within the aircraft passenger cabin, both the functions of cabin wall illumination and provision of personal reading lighting may be maintained without the need to move the aircraft passenger cabin light(s).

In an embodiment, the coupling between the reading light switches and the personal reading light units is to be modified manually by changing the electrical connections between the reading light switches and the personal reading light units. The aircraft passenger cabin lighting system may, for example, comprise configuration switches, which allow for modifying the electrical connections between the reading light switches and the personal reading light units by manually switching said configuration switches, when the seat configuration within the passenger cabin is altered.

In an embodiment, the aircraft passenger cabin lighting system further comprises a controller, which is configured for controlling the coupling between the plurality of reading light switches and the personal reading light units. The controller may in particular be re-configurable, in order to allow for changing between different associations between the plurality of reading light switches and personal reading light units. Each of said associations may correspond to a different seat configuration within the passenger cabin.

An aircraft passenger cabin lighting system comprising such a controller may allow for changing the assignment between the plurality of reading light switches and the personal reading light units very easily by re-configuring the controller. In such a configuration, there is in particular no need for manually amending the physical connections between the reading light switches and the personal reading light units and/or for manually switching any configuration switches. As a result, the assignment between the plurality of reading light switches and the personal reading light units may be adapted even more conveniently to a new configuration of the passenger seats. Also, as part of the initial assembly of the passenger seats and the aircraft passenger cabin lights within the aircraft passenger cabin, a convenient assignment/association between the plurality of reading light switches and the personal reading light units may be carried out.

A plurality of seat configurations and respectively associated assignments between the plurality of reading light switches and the personal reading light units may be stored within the controller. When one of said seat configurations is realized within the passenger cabin, the corresponding assignment, which is stored within the controller, may be retrieved and implemented in a convenient manner.

In an embodiment, the aircraft passenger cabin lighting system may comprise a single controller, also referred to as central controller, which is configured for controlling all the couplings between the plurality of reading light switches and the personal reading light units, which are present within the passenger cabin. In particular, the central controller may control the couplings for the personal reading light units of a plurality of aircraft passenger cabin lights.

In an alternative embodiment, the aircraft passenger cabin lighting system may comprise a plurality of decentralized controllers. In such an embodiment, each of the controllers may be configured for controlling the couplings between a selected subgroup of reading light switches and a selected subgroup of personal reading light units within the passenger cabin, which are associated with the respective controller, respectively.

In an embodiment, a respective controller may be provided in each of the passenger service units for coupling the reading light switches of the respective passenger service unit with corresponding personal reading light units. In particular, a particular controller of a particular passenger service unit may couple the reading light switches of the particular passenger service unit with that aircraft passenger cabin light that is arranged at the same seat row as the particular passenger service unit. The controller in the passenger service unit may control both the personal reading light functionality, e.g. by controlling selected ones of the plurality of personal reading light units, and the cabin wall illumination functionality and additional visual signs, if present. In this way, the aircraft passenger cabin light may be controlled fully from the passenger service unit, and a separate control network for controlling the aircraft passenger cabin lights may be omitted. It is also possible that the passenger service unit acts as the power supply for the aircraft passenger cabin light, thus eliminating the need for connecting the aircraft passenger cabin light to a separate power supply network.

In an alternative embodiment, a controller may be provided in each of a plurality of aircraft passenger cabin lights, and each controller may be configured for assigning reading light switches to the personal reading light units of the respective aircraft passenger cabin lights.

In an embodiment, which comprises a plurality of controllers, each controller may comprise an interface, which allows for connecting the plurality of controllers. In this way, the plurality of controllers may communicate with each other and may provide for a coordinated control of a plurality of aircraft passenger cabin lights within the aircraft passenger cabin.

In an embodiment, the interface may be a bus interface for coupling the controllers to an electric bus.

In an embodiment, the controllers are configured to be coupled to each other via a wireless data connection, such as WLAN, Bluetooth, or a similar wireless data transmission protocol.

By communicating with each other, the controllers may synchronize the assignments between the reading light switches and the personal reading light units. Such a synchronization may help in modifying the assignments between the reading light switches and the personal reading light units. It may in particular simplify the modification of the assignment, when the seat configuration within the aircraft passenger cabin is changed.

In an embodiment, which comprises a plurality of controllers, the plurality of controllers may include a master controller, which is configured for controlling and monitoring the operation of the other controllers, when the assignments between the reading light switches and the personal reading light units are changed. In an embodiment, which includes a master controller, the assignments of all controllers may be changed by providing an input to only one of the controllers, in particular to the master controller.

In an embodiment, the master controller is one of the controllers, which are provided in the passenger service units, or one of the controllers, which are provided in the plurality of aircraft passenger cabin lights. In other words, in such a configuration, one of the plurality of controllers is selected and set-up as the master controller.

In another embodiment, the master controller is an additional controller, which is provided in addition to the controllers that are provided in addition to the passenger service units and/or in addition to the controllers provided in the plurality of aircraft passenger cabin lights.

In an embodiment, the master controller is a mobile controller, in particular a handheld device. The mobile controller may be configured to be coupled only temporarily to at least one of the other controllers of the aircraft passenger cabin lighting system for changing the assignments between the reading light switches and the personal reading light units, when the seat configuration within the passenger cabin is changed.

In an embodiment, the master controller is coupled to at least one other controller via a cable connection, in particular via a plug and a corresponding socket.

In an embodiment, the master controller may be coupled to the at least one other controller via a wireless data connection, such as WLAN, Bluetooth, or a similar wireless data transmission protocol. This may allow for a very easy and convenient modification of the assignments between the reading light switches and the personal reading light units.

Exemplary embodiments of the invention further include an aircraft, in particular an airplane or a helicopter, comprising an aircraft passenger cabin, which has at least one aircraft passenger cabin wall extending in a longitudinal direction, and which houses a plurality of passenger seats. The aircraft further comprises at least one aircraft passenger lighting system according to an exemplary embodiment of the invention, wherein the aircraft passenger cabin light of each of the at least one aircraft passenger lighting system extends along a particular one of the at least one aircraft passenger cabin wall along the longitudinal direction. The additional features, modifications, and effects, as described herein with respect to exemplary embodiments of the aircraft passenger cabin light and/or with respect to exemplary embodiments of the aircraft passenger cabin lighting system, apply to the aircraft in an analogous manner.

In an embodiment, the plurality of passenger seats are arranged in passenger seat rows, each passenger seat row extending in a transverse direction of the aircraft passenger cabin. The transverse direction is oriented transverse to the longitudinal direction. The passenger seat rows are spaced apart from each other along the longitudinal direction.

The cabin wall illumination assembly of the aircraft passenger cabin light may extend along a single seat row in the longitudinal direction or may extend along a plurality of seat rows in the longitudinal direction. Such a configuration, in which the aircraft passenger cabin light extends along a plurality of seat rows, may allow for reducing the number of aircraft passenger cabin lights, which are installed within the passenger cabin. It may further allow for changing the seat configuration, i.e. the number of seat rows and/or the distances between adjacent seat rows, in a particularly convenient manner without replacing or moving the aircraft passenger cabin light.

In an embodiment, the aircraft comprises a plurality of passenger service units. A respective passenger service unit may be arranged next to, in particular above, each of the passenger seat rows, and each of the passenger service units may comprise reading light switches for switching the particular personal reading light units, which illuminate passenger seats arranged next to, in particular below, the respective passenger service unit.

Such a configuration may allow for passengers, who are sitting in the passenger seats next to the passenger service unit, to conveniently activate and deactivate the respectively associated personal reading light units which are configured for providing their personal reading light illumination.

In an embodiment, the aircraft passenger cabin light is installed between the at least one passenger service unit and a wall of the passenger cabin. The aircraft passenger cabin light may in particular be installed in a gap, which is formed between the wall of the passenger cabin and overhead baggage compartments, which are installed above the passenger seats. Such a position of the aircraft passenger cabin light may allow for an efficient illumination of the wall of the passenger cabin as well as for providing suitable personal reading light illumination to passengers sitting next to, in particular below, the at least one passenger service unit.

BRIEF DESCRIPTION OF DRAWINGS

Further exemplary embodiments of the invention are described below with respect to the accompanying drawings, wherein.

DETAILED DESCRIPTION

Figure 1:
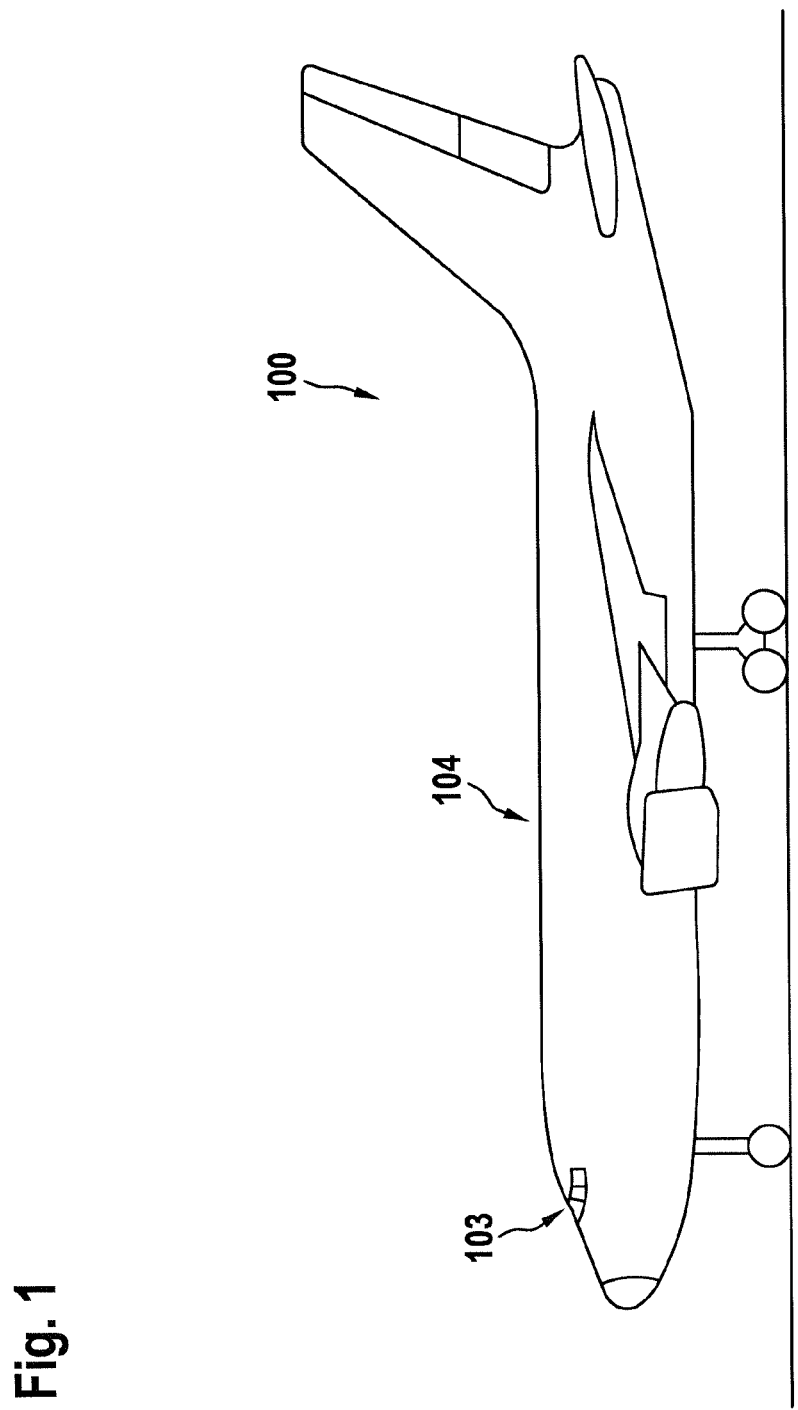
FIG. 1 depicts a schematic side view of an aircraft in accordance with an exemplary embodiment of the invention.

FIG. 1 depicts a schematic side view of an aircraft 100, in particular of an air plane, in accordance with an exemplary embodiment of the invention. In the exemplary embodiment shown in FIG. 1, the aircraft 100 is a large passenger air plane, comprising a cockpit 103 and a passenger cabin 104. The aircraft 100 may be a commercial passenger air plane, a private air plane, or a military aircraft. It is also possible that the aircraft is a rotorcraft, such as a helicopter.

Figure 2:
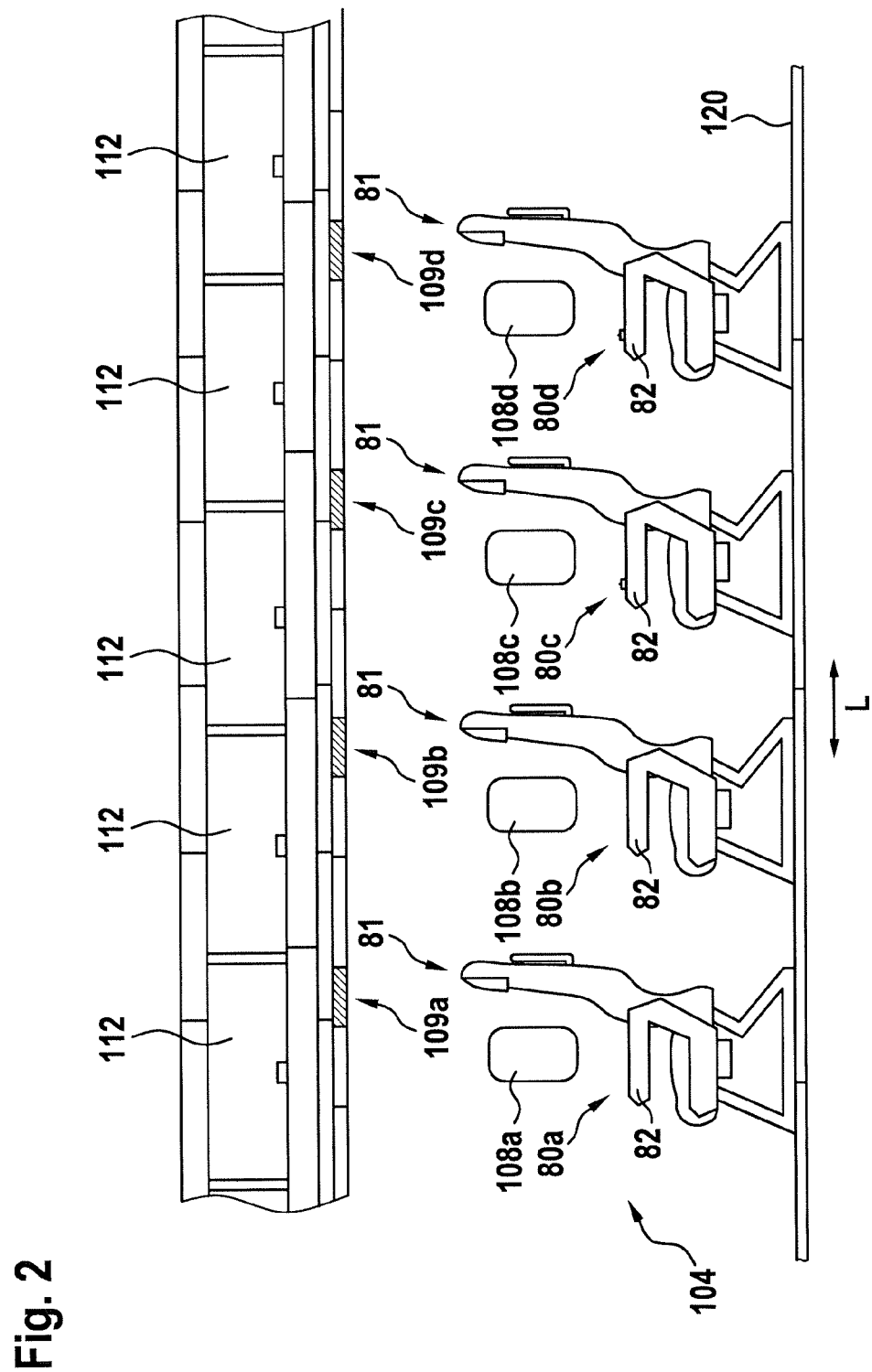
FIG. 2 shows a schematic longitudinal cross-sectional view of a section of a passenger cabin of the aircraft of FIG. 1.

FIG. 2 shows a schematic longitudinal cross-sectional view of a section of the passenger cabin 104 of the aircraft 100 which is shown in FIG. 1.

Four seats 81, which are also referred to as passenger seats 81, are visible in FIG. 2. The passenger seats 81 comprise arm rests 82 and are mounted to a floor 120 of the passenger cabin 104. Each of the depicted passenger seats 81 belongs to a different seat row 80a-80d. The seat rows 80a-80d are spaced apart from each other along the longitudinal direction L of the passenger cabin 104.

For each of the seat rows 80a-80d, a window 108a-108d is provided, which allows the passengers to view the outside of the aircraft 100. Further, a plurality of overhead baggage compartments 112, which provide storage space for the passengers' baggage, are provided above the passenger seats 81.

Each seat row 80a-80d may include a plurality of passenger seats 81, for example three passenger seats 81, which are arranged next to each other along a lateral direction T, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81. The hidden passenger seats are visible in FIG. 4, which will be discussed in detail further below.

An aircraft overhead passenger service unit (PSU) 109a-109d is provided above each of the seat rows 80a-80d, respectively.

Figure 3:
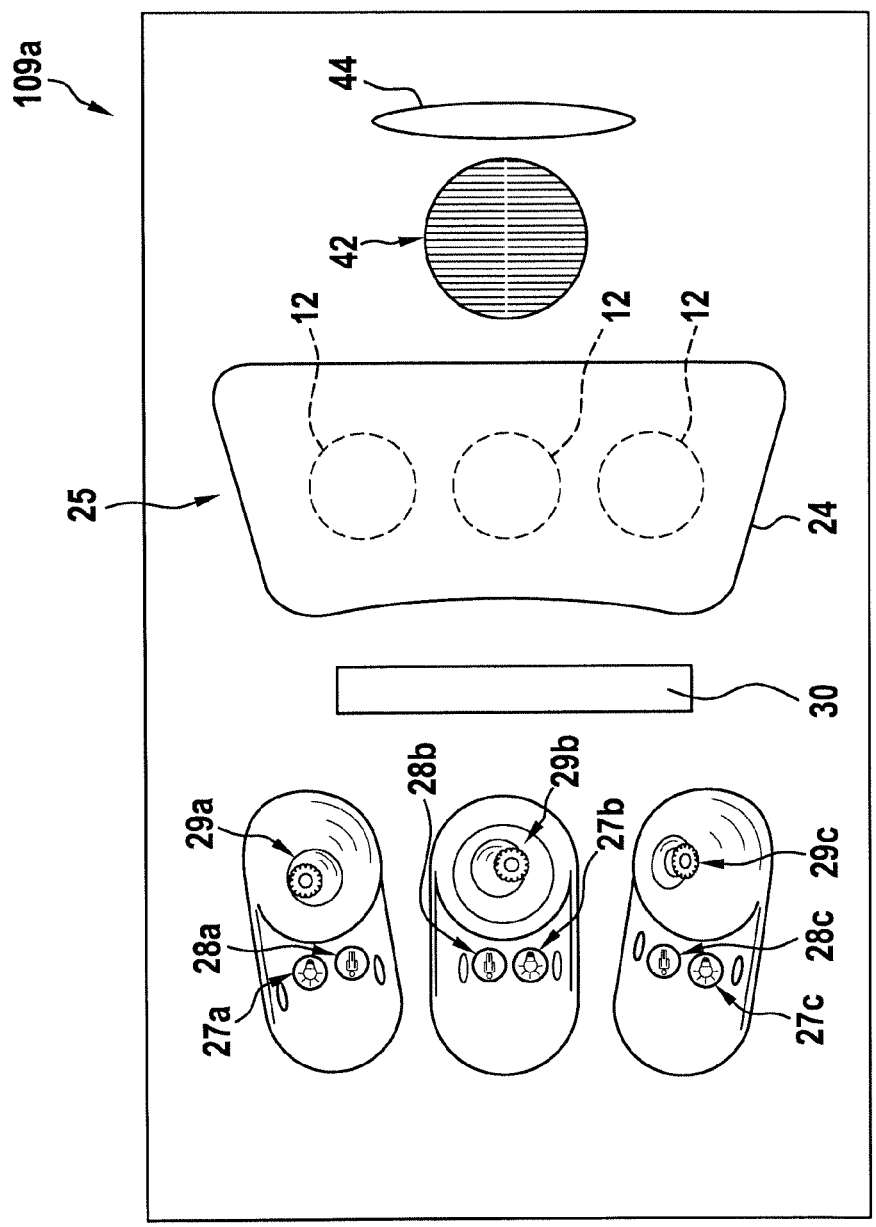
FIG. 3 depicts a schematic plan view of an aircraft overhead passenger service unit.

FIG. 3 depicts a schematic plan view of an aircraft overhead passenger service unit 109a, as it is seen from the position of a passenger sitting on a passenger seat 81 below the aircraft overhead passenger service unit 109a.

On the side, which is shown to the left side in FIG. 3, the aircraft overhead passenger service unit 109a comprises six electrical switches 27a-27c, 28a-28c.

The electrical switches 27a-27c, 28a-28c are grouped in pairs, with each pair comprising two electrical switches 27a-27c, 28a-28c, respectively. Each pair of electrical switches 27a-27c, 28a-28c is assigned to one of three passenger seats 81, which are arranged below the passenger service unit 109a.

A first switch 27a-27c of each pair of switches is configured as a reading light switch 27a-27c for switching a personal reading light, which is assigned to each of the passenger seats 81, respectively. In an aircraft passenger cabin lighting system according to an exemplary embodiment of the invention, the personal reading lights are not installed within the passenger service units 109a-109d. The personal reading lights are therefore not visible in FIG. 3. The details of the personal reading light units, as provided in aircraft passenger cabin lights according to exemplary embodiments of the invention, will be discussed in detail further below with reference to FIGS. 4 to 8.

The second switch 28a-28c of each pair of switches is configured for triggering a signal for calling cabin service personnel.

A row of three adjacent gaspers 29a-29c is provided next to the pairs of switches 27a-27c, 28a-28c. Each of the gaspers 29a-29c is assigned to one of three passenger seats 81, which are arranged below the passenger service unit 109a.

Adjacent to the gaspers 29a-29c, there is an oxygen mask storage portion 25 comprising a movable door 24, which covers an oxygen mask storage compartment. The oxygen mask storage compartment houses at least three oxygen masks 12, which are coupled to an oxygen supply 30, for example to an oxygen source such as a pressurized oxygen container or a chemical oxygen generator.

In an emergency situation, which results in a loss of pressure within the passenger cabin 104, the movable door 24 will open and allow the oxygen masks 12 to drop out of the oxygen mask storage compartment. Each of the passengers sitting below the aircraft overhead passenger service unit 109a may grasp one of the oxygen masks 12. After being activated, the oxygen supply 30 may supply an oxygen rich gas to the oxygen masks 12, in order to allow the passengers to breathe almost normally, even in case of a pressure loss within the passenger cabin 104.

The oxygen supply 30 may be activated in response to an emergency signal in response to a pressure loss within the passenger cabin. Alternatively, the oxygen supply 30 may be activated in response to a first breath taken by a passenger through the oxygen mask 12.

Towards the right from the oxygen mask storage portion 25 in the viewing direction of FIG. 3, a grid 42 is formed within the aircraft overhead passenger service unit 109a. A loudspeaker (not shown), which may be used for delivering acoustic announcements to the passengers, may be arranged behind said grid 42.

Next to the grid 42, there is a display panel 44 comprising at least one selectively illuminable visual sign, which may be selectively illuminated from behind for showing a plurality of different visual signs/messages (not shown), such as a "non smoking" sign, a "fold up your table" sign, a "switch off your electronic devices" sign, and/or a "fasten you seat belt" sign.

Figure 4:
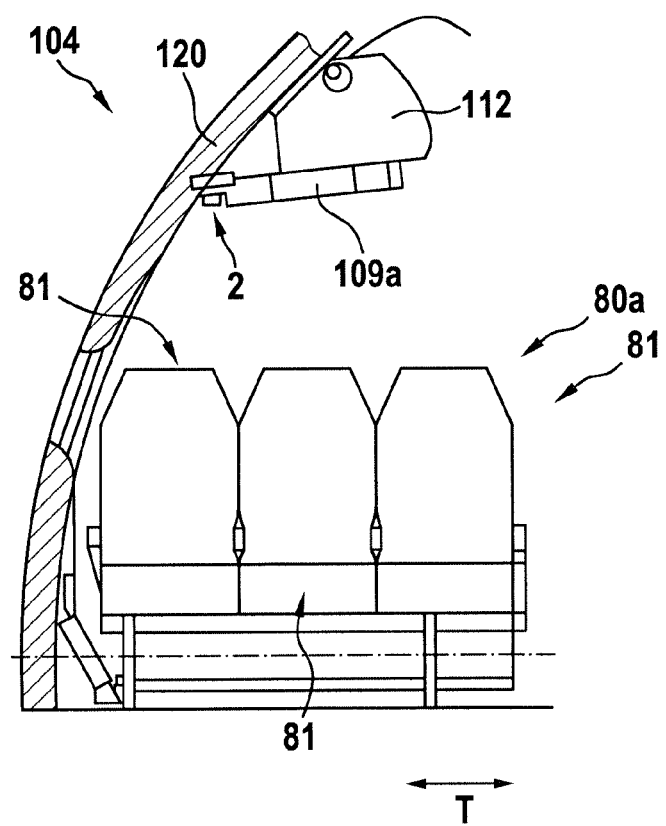
FIG. 4 shows a lateral cross-sectional view of a portion of the passenger cabin of the aircraft shown in FIG. 1.

FIG. 4 shows a partial cross-sectional view of the passenger cabin 104 in a plane which is oriented in a lateral direction, i.e. in a plane which is orthogonal to the plane of the longitudinal cross-sectional view depicted in FIG. 2.

FIG. 4 shows a single seat row 80a comprising three passenger seats 81, which are arranged next to each other along the lateral direction T.

An overhead baggage compartment 112 and a passenger service unit 109a, for example a passenger service unit 109a as it is shown in FIG. 3, are installed above the seat row 80a.

An aircraft passenger cabin light 2 according to an exemplary embodiment of the invention is provided above the passenger seats 81. The aircraft passenger cabin light 2 is arranged at or next to a side wall 120 of the passenger cabin 104 and extends along the longitudinal direction L of the passenger cabin 104, i.e. extends orthogonal to the drawing plane of FIG. 4. The aircraft passenger cabin light 2 may in particular extend along a plurality of seat rows along the longitudinal direction L.

The aircraft passenger cabin light 2 is configured for providing general cabin wall illumination. The aircraft passenger cabin light 2 is further configured for providing selectively switchable personal reading light illumination to each of the passenger seats 81.

In the following, the details of an aircraft passenger cabin light 2 according to an exemplary embodiment of the invention will be discussed.

Figure 5:
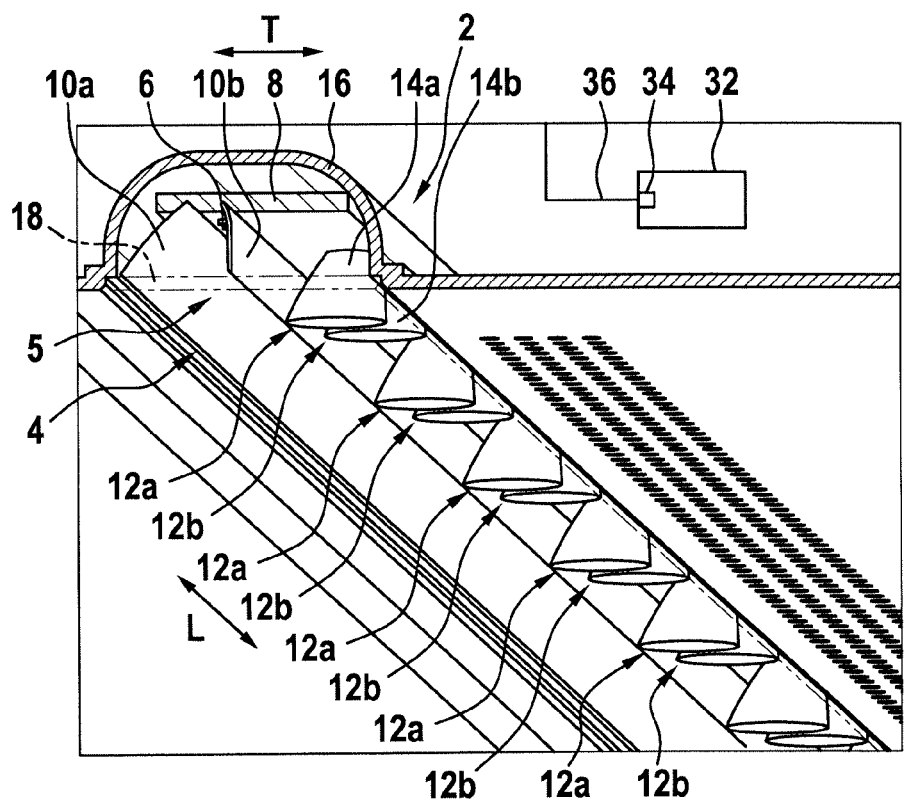
FIG. 5 shows a perspective view of an aircraft passenger cabin light according to an exemplary embodiment of the invention.
Figure 6:
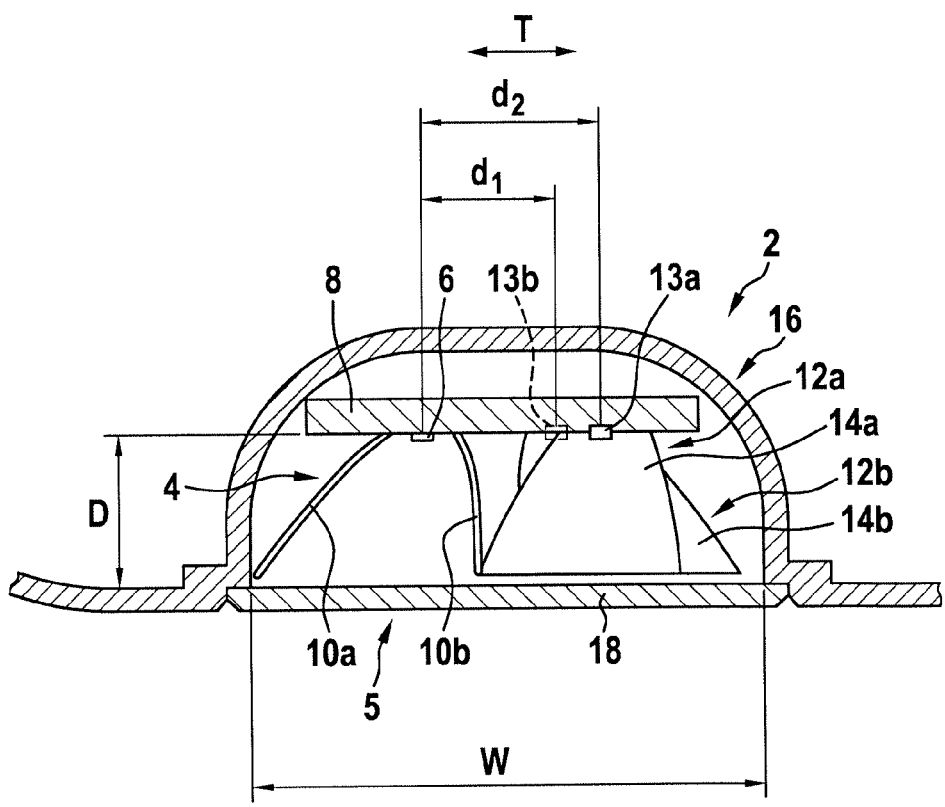
FIG. 6 shows a cross-sectional view of the aircraft passenger cabin light shown in FIG. 5.

FIG. 5 shows a perspective view, and FIG. 6 shows a cross-sectional view of an aircraft passenger cabin light 2 according to an exemplary embodiment of the invention.

The aircraft passenger cabin light 2 comprises a housing 16, which extends along the longitudinal direction L of the passenger cabin 104. In the embodiment depicted in FIGS. 5 and 6, the housing 16 is provided by a hollow profile, which extends in the longitudinal direction L of the passenger cabin 104. The housing 16 may in particular extend over a plurality of seat rows along the longitudinal direction L. It is also possible that the housing 16 has a length that substantially corresponds to the distance between adjacent seat rows.

An opening 5 is provided at the lower side of the profile/housing 16 facing the passenger seats 81. The opening 5 is covered by an at least partially light transmissive cover 18. In the lateral direction T, the opening 5 may have a width w (see FIG. 6) in the range of between 22.9 mm (0.9 inches) and 73.7 mm (2.9 inches), in particular a width w in the range of between 35.6 mm (1.4 inches) and 61.0 mm (2.4 inches).

The aircraft passenger cabin light 2 comprises a cabin wall illumination assembly 4, which extends along the longitudinal direction L, and which is configured for illuminating at least a portion of the side wall 120 of the passenger cabin 104.

The cabin wall illumination assembly 4, which is depicted in FIGS. 5 and 6, comprises two reflectors 10a, 10b, which extend along the longitudinal direction L. The reflectors 10a, 10b may have a length in the range of between 254 mm (10 inches) and 1829 mm (72 inches), in particular in the range of between 254 mm (10 inches) and 914 mm (36 inches). The reflectors 10a, 10b may in particular extend over a plurality of seat rows along the longitudinal direction L.

In the embodiment depicted in FIGS. 5 and 6, the two reflectors 10a, 10b are mounted to and supported by a common support 8. The distance D between the support 8 and the light transmissive cover 18 may be in the range of between 5.1 mm (0.2 inches) and 15.2 mm (0.6 inches), the distance D between the support 8 and the light transmissive cover 18 may in particular be in the range of between 7.6 mm (0.3 inches) and 12.7 mm (0.5 inches).

The cabin wall illumination assembly 4 further comprises a plurality of wall illumination light sources 6. The wall illumination light sources 6 are arranged between the two reflectors 10a, 10b. Only one of the plurality of wall illumination light sources 6 is visible in FIGS. 5 and 6, respectively.

The wall illumination light sources 6 may be arranged in an array along the longitudinal direction L of the aircraft passenger cabin light 2/along the longitudinal direction of the aircraft passenger cabin light 2. The wall illumination light sources 6 may in particular be arranged in a row, which extends along the longitudinal direction L.

The wall illumination light sources 6 are supported by the common support 8. The common support 8 may be a printed circuit board, comprising electrical paths (not shown) for supplying electric energy to the wall illumination light sources 6.

Figure 7A:
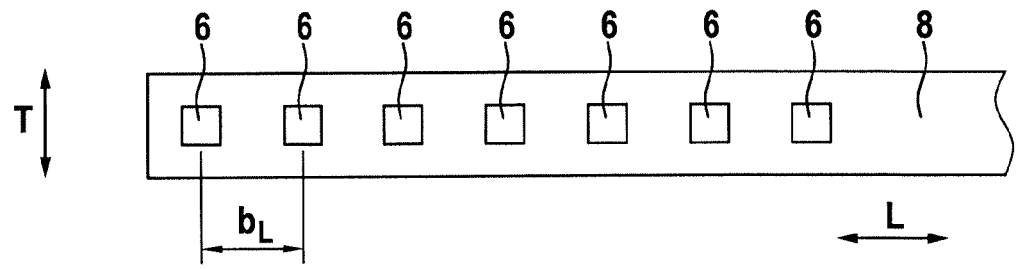
FIGS. 7A to 7C depict schematic plan views of three different exemplary configurations of wall illumination light sources.
Figure 7B:
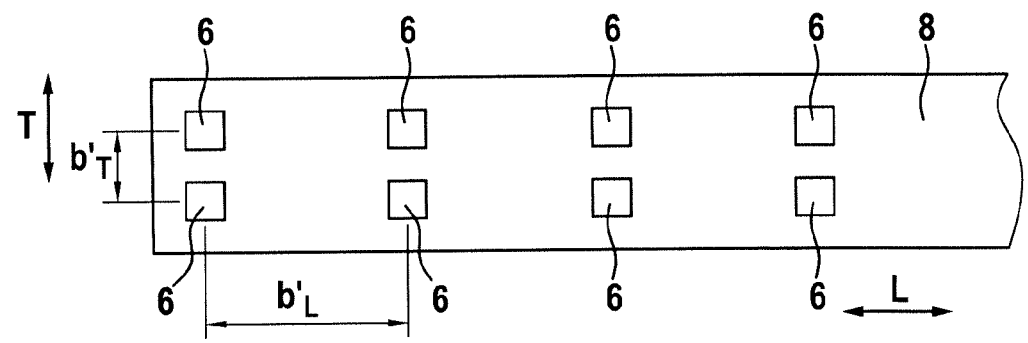
Figure 7C:
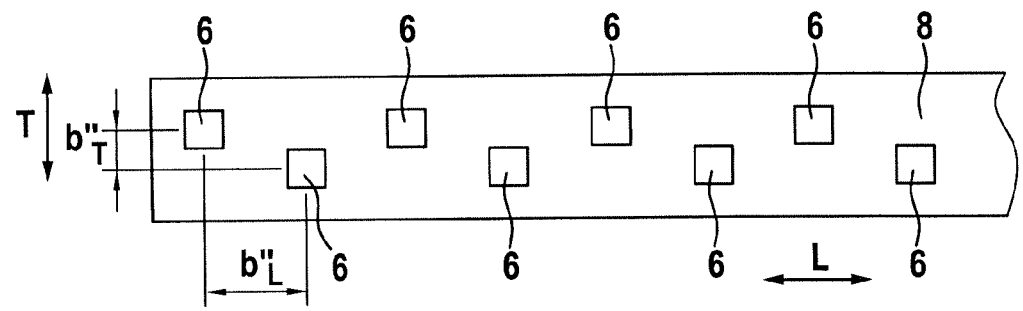

FIGS. 7A to 7C depict schematic plan views of three different exemplary configurations of the wall illumination light sources 6. In all of the three different exemplary configurations, the wall illumination light sources 6 are considered to be arranged in an array that extends along the longitudinal direction L.

In a first embodiment, which is depicted in FIG. 7A, the wall illumination light sources 6 are arranged along a straight row next to each other along the longitudinal direction L. In the embodiment depicted in FIG. 7A, the wall illumination light sources 6 have a uniform spacing with respect to each other. The distances bL between adjacent wall illumination light sources 6 may, for example, be in a range of between 20.3 mm (0.8 inches) and 61.0 mm (2.4 inches). A uniform spacing between the wall illumination light sources 6 may allow for a particularly uniform illumination of the cabin wall of the aircraft passenger cabin.

In alternative embodiments, the distances between adjacent wall illumination light sources 6 may vary. The wall illumination light sources 6 may in particular be arranged in groups of wall illumination light sources 6, wherein the distances between the wall illumination light sources 6 within a group are smaller than the distances between adjacent groups.

In another embodiment, which is depicted in FIG. 7B, two wall illumination light sources 6 are arranged next to each other along the lateral/transverse direction T, which is oriented orthogonal to the longitudinal direction L.

The distance b'T between the wall illumination light sources 6 in the lateral/transverse direction T may be in the range of between 5.1 mm (0.2 inches) and 35.6 mm (1.4 inches), and the distances b'L between the wall illumination light sources 6 in the longitudinal direction L may be in the range of between 20.3 mm (0.8 inches) and 61.0 mm (2.4 inches).

In yet another embodiment, which is depicted in FIG. 7C, the wall illumination light sources 6 are spaced apart from each other in the longitudinal direction L, and the positions of the wall illumination light sources 6 are also offset in the lateral/transverse direction T from a common straight line, which extends along the longitudinal direction L. As a result, the wall illumination light sources 6 are arranged in a zig-zag-configuration, which extends along the longitudinal direction L.

In said zig-zag-configuration, the distance b"T between the wall illumination light sources 6 in the lateral direction T may be in the range of between 5.1 mm (0.2 inches) and 35.6 mm (1.4 inches), and the distances b"L between the wall illumination light sources 6 in the longitudinal direction L may be in the range of between 20.3 mm (0.8 inches) and 61.0 mm (2.4 inches).

The wall illumination light sources 6 may be LEDs or they may comprise LEDs.

All wall illumination light sources 6 may be configured to emit light having the same color.

Alternatively, the cabin wall illumination assembly 4 may comprise wall illumination light sources 6 which emit light of at least two different colors. The wall illumination light sources 6 may be individually switchable, in order to allow for selectively adjusting the color and/or the intensity of the light, which is emitted by the cabin wall illumination assembly 4.

As stated above, the cabin wall illumination assembly 4 of FIGS. 5 and 6 comprises two reflectors 10a, 10b, which extend along the longitudinal direction L. The two reflectors 10a, 10b are in the form of extruded profiles. In this way, a reflector assembly is given whose transverse cross-section is the same or substantially the same at different points along the longitudinal extension of the aircraft passenger cabin light 2.

The two reflectors 10a, 10b are shaped to have a collimating effect on the light emitted by the wall illumination light sources 6. In particular, the two reflectors 10a, 10b are shaped and arranged to direct the light from the wall illumination light sources 6 towards a narrow angular range in the transverse cross-section, such that a large portion or all of the light from the wall illumination light sources is used for illuminating the cabin wall. Said narrow angular range is in particular significantly more narrow than the light emission distribution of the wall illumination light sources 6 in the transverse cross-section.

Although the cabin wall illumination assembly 4 depicted in FIGS. 5 and 6 comprises two reflectors 10a, 10b, which are arranged opposite to each other with the wall illumination light sources 6 located between the two reflectors 10a, 10b, other configurations of the cabin wall illumination assembly 4, are possible as well. In particular, configurations which comprise only a single reflector are possible as well.

In an embodiment, in which the cabin wall illumination assembly 4 comprises only a single reflector, said single reflector may be arranged on only one side of the wall illumination light sources 6.

In another embodiment, the single reflector may be shaped so that a first portion of the single reflector is located on a first side of the wall illumination light sources 6, and a second portion of the single reflector is located on a second side of the wall illumination light sources 6.

The cabin wall illumination assembly 4 may also comprise light transmissive optical elements (not shown), such as lenses and/or prisms, for forming the light output of the cabin wall illumination assembly 4. The transmissive optical elements may be attached to and/or integrated with the wall illumination light sources 6. The transmissive optical elements may include total internal reflection light transmissive optical elements, i.e. light transmissive optical elements with at least one internal surface at which the light is totally reflected.

The aircraft passenger cabin light 2 further comprises a plurality of personal reading light units 12a, 12b for providing personal reading light illumination to passengers sitting on the passenger seats 81.

The plurality of personal reading light units 12a, 12b are arranged as an array that extends along the longitudinal direction L and along the cabin wall illumination assembly 4. The plurality of personal reading light units 12a, 12b may in particular be arranged in a row of personal reading light units 12a, 12b, which extends along the longitudinal direction L.

The personal reading light units 12a, 12b are arranged next to the cabin wall illumination assembly 4 in the lateral direction T, which is transverse to the longitudinal direction L.

The array of personal reading light units 12a, 12b may in particular be arranged besides the cabin wall illumination assembly 4 in a configuration, in which the personal reading light units 12a, 12b are offset from the cabin wall illumination assembly 4 in the lateral direction. The distances d1, d2 between the personal reading light units 12a, 12b and the wall illumination light sources 6 of the cabin wall illumination assembly 4 may be in the range of between 7.6 mm (0.3 inches) and 25.4 mm (1 inch) in the lateral direction T.

In the embodiment depicted in FIGS. 5 and 6, the plurality of personal reading light units 12a, 12b are arranged in groups of personal reading light units 12a, 12b. Each group of personal reading light units comprises two personal reading light units, wherein one personal reading light of each group is denoted with reference numeral 12a and the other personal reading light unit of each group is denoted with reference numeral 12b.

Arranging the personal reading light units 12a, 12b in groups, wherein each group comprises two personal reading light units 12a, 12b, is only exemplary. In further embodiments, which are not explicitly shown in the figures, each group of personal reading light units 12a, 12b may comprise more than two personal reading light units 12a, 12b. Each group of personal reading light units 12a, 12b may in particular comprise a number of personal reading light units 12a, 12b that is equal to the number of passenger seats 81 in each seat row 80a-80d.

Thus, in a configuration, in which three passenger seats 81 are arranged next to each other in a seat row 80a, as it is depicted in FIG. 4, each group of personal reading light units 12a, 12b may comprise three personal reading light units, respectively.

Figure 8A:
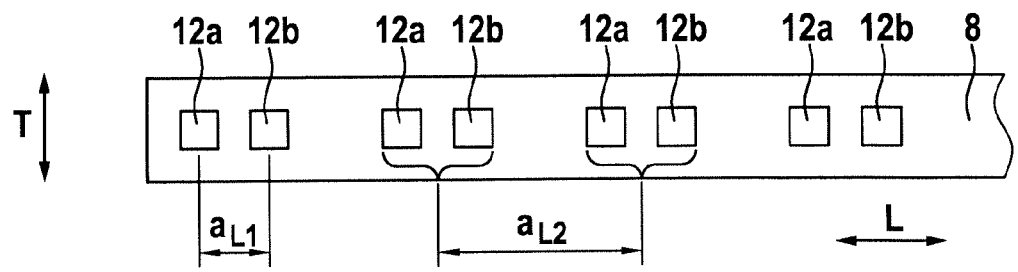
FIGS. 8A to 8C depict schematic plan views of three different exemplary configurations of personal reading light units.
Figure 8B:
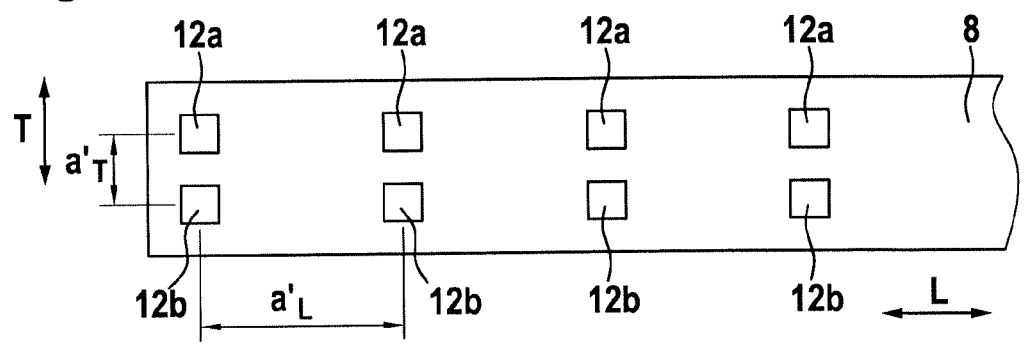
Figure 8C:
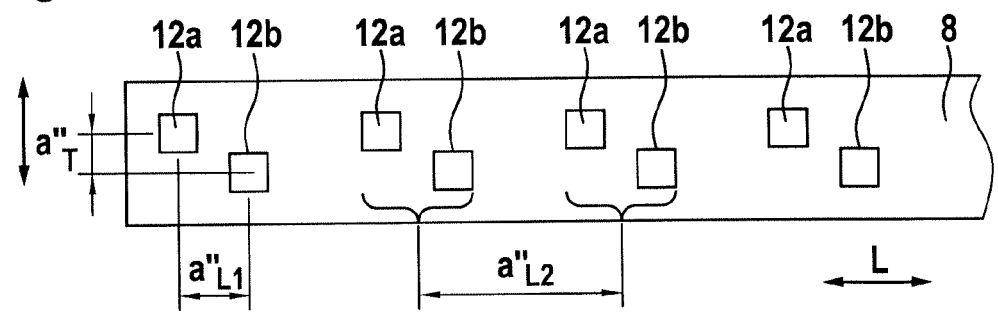

FIGS. 8A to 8C depict schematic plan views of three different exemplary configurations of personal reading light units 12a, 12b.

In a first embodiment, which is depicted in FIG. 8A, the plurality of personal reading light units 12a, 12b of each group of personal reading light units 12a, 12b are arranged along a straight row next to each other along the longitudinal direction. The distance aL1 along the longitudinal direction between the personal reading light units 12a, 12b within each group of personal reading light units 12a, 12b is smaller than the distance aL2 between adjacent groups of personal reading light units 12a, 12b.

The distance aL1 between the personal reading light units 12a, 12b within each group of personal reading light units 12a, 12b may, for example, be in a range of between 20.3 mm (0.8 inches) and 61.0 mm (2.4 inches).

The distance aL2 between adjacent groups of personal reading light units 12a, 12b may be in a range of between 61.0 mm (2.4 inches) and 152 mm (6 inches).

In another embodiment, which is depicted in FIG. 8B, the personal reading light units 12a, 12b of each group of personal reading light units 12a, 12b are arranged next to each other along the lateral direction T, which is oriented substantially orthogonal to the longitudinal direction L.

The distance a'T between the personal reading light units 12a, 12b of each group of personal reading light units 12a, 12b in the lateral direction T may be in the range of between 5.1 mm (0.2 inches) and 35.6 mm (1.4 inches).

The distance a'L between adjacent groups of personal reading light units 12a, 12b in the longitudinal direction L may be in a range of between 61.0 mm (2.4 inches) and 152 mm (6 inches).

In yet another embodiment, which is depicted in FIG. 8C, the personal reading light units 12a, 12b are spaced apart from each other in the longitudinal direction L, and the positions of the personal reading light units 12a, 12b are also offset in the lateral direction T from a common straight line, which extends along the longitudinal direction L. As a result, the personal reading light units 12a, 12b are arranged in a zig-zag-configuration, which extends along the longitudinal direction L.

In said zig-zag-configuration, the distance a"T between the personal reading light units 12a, 12b within each group of personal reading light units 12a, 12b along the lateral direction T may be in the range of between 5.1 mm (0.2 inches) and 35.6 mm (1.4 inches).

The distance a"L1 between the personal reading light units 12a, 12b within each group of personal reading light units 12a, 12b along the longitudinal direction L may, for example, be in a range of between 20.3 mm (0.8 inches) and 61.0 mm (2.4 inches).

The distance a"L2 between adjacent groups of personal reading light units 12a, 12b may be in a range of between 61.0 mm (2.4 inches) and 152 mm (6 inches).

Referring again to FIGS. 5 and 6, each of the personal reading light units 12a, 12b comprises a reading light source 13a, 13b and an optical element 14a, 14b. The optical elements 14a, 14b are configured for forming and directing the light outputs, which are emitted by the personal reading light units 12a, 12b, towards the associated passenger seats. In particular, the optical elements 14a, 14b are arranged and shaped for forming suitable light outputs that provide personal reading light illumination.

The optical elements 14a, 14b of the personal reading light units 12a, 12b may include reflectors, as depicted in FIGS. 5 and 6, and/or lenses for forming the light output, which is emitted by the personal reading light units 12a, 12b. The lenses may include total internal reflection (TIR) lenses. The reflectors may for example have a parabolic shape or a spherical shape.

The reading light sources 13a, 13b and the optical elements 14a 14bs are mounted to and supported by the common support 8. The common support 8 may be a printed circuit board comprising electrical paths (not shown) for supplying electric energy to the reading light sources 13a, 13b.

The reading light sources 13a, 13b may be LEDs or they may comprise LEDs. Each of the personal reading light units 12a, 12b may comprise a single reading light source 13a, 13b or a plurality of reading light sources 13a, 13b.

The personal reading light units 12a, 12b may in particular comprise a plurality of reading light sources 13a, 13b, which emit light of the same color. It is also possible that the personal reading light units 12a, 12b comprise reading light sources of different colors, respectively. The reading light sources of each personal reading light unit 12a, 12b may be individually switchable and/or dimmable, in order to allow for selectively adjusting the color and/or the intensity of the light, which is emitted by the respective personal reading light unit 12a, 12b.

With the spacing between the groups of personal reading light units 12a, 12b, an optimized trade-off between flexibility in providing reading light functionality and usage of lighting resources may be achieved. On the one hand, a small spacing between the groups of personal reading light units 12a, 12b may provide a high level of flexibility in selecting a particular group of personal reading light units for a particular position of a seat row. On the other hand, a larger spacing between the groups of personal reading light units 12a, 12b may allow for a larger portion of reading light units 12a, 12b to be assigned to passenger seats in any given configuration, leading to an overall higher usage ratio of the personal reading light units 12a, 12b. In general, with more personal reading light units 12a, 12b being provided per unit length than passenger seats per unit length of the aircraft passenger cabin, the passenger seats may be provided with reading light functionality in a highly targeted manner, without having to exactly match the positions of the aircraft passenger cabin lights and the positions of the seat rows. The over-capacity of personal reading light units may obviate the need for a high positioning accuracy of the aircraft passenger cabin lights for a particular seat configuration.

Figure 9:
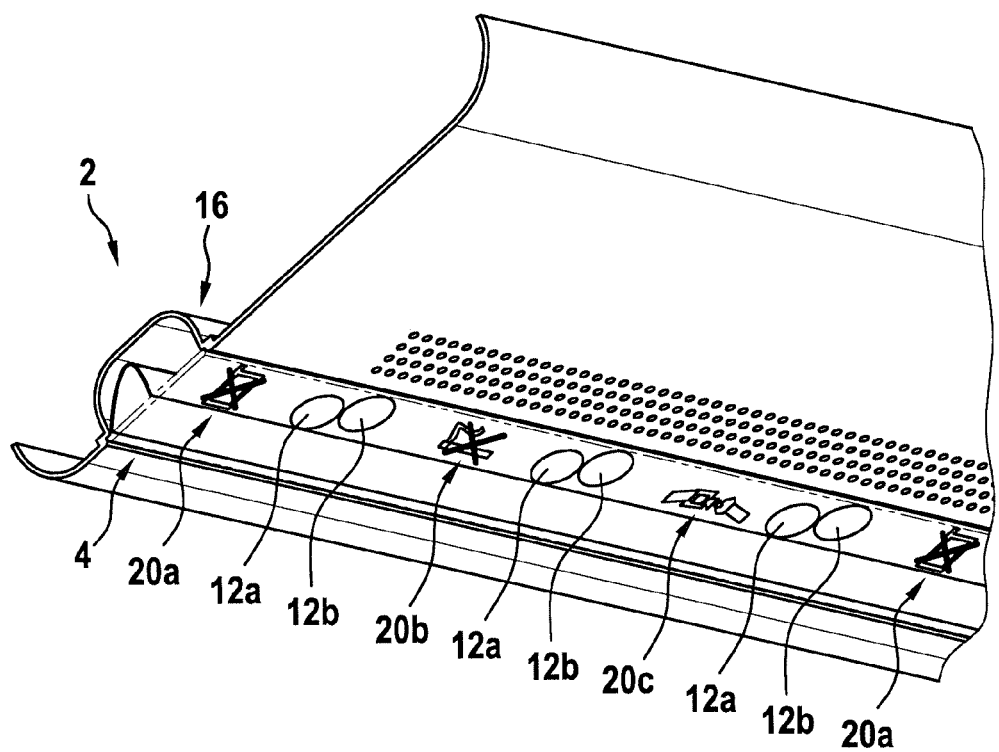
FIG. 9 shows an exemplary embodiment of an aircraft passenger cabin light, as it is seen from the position of a passenger sitting on a passenger seat below the aircraft passenger cabin light.

The aircraft passenger cabin light 2 may further comprise illuminable visual signs 20a-20c, which may be selectively illuminated for providing visual information to the passengers. Examples of such illuminable visual signs 20a-20c are depicted in FIG. 9. FIG. 9 shows a perspective view of an exemplary embodiment of an aircraft passenger cabin light 2, as it is seen from the position of a passenger sitting on a passenger seat 81 below the aircraft passenger cabin light 2.

The illuminable visual signs 20a-20c may include at least one of "fold up your table" sign 20a, a "non-smoking" sign 20b, a "fasten your seatbelt" sign 20c, and a "switch off your electronic devices" sign (not shown). The illuminable visual signs 20a-20c may be selectively illuminable by activating a corresponding light source (not shown), which is associated with the respective illuminable visual sign 20a-20c and which is mounted to the common support 8 in a position behind the respective illuminable visual sign 20a-20c.

Different illuminable visual signs 20a-20c may be provided along the longitudinal direction L of the aircraft passenger cabin light 2, as it is depicted in the exemplary configuration of FIG. 9.

Exemplary embodiments of the invention further include an aircraft passenger cabin lighting system. The aircraft passenger cabin lighting system comprises at least one aircraft passenger cabin light 2, as it has been described before, and a plurality of reading light switches 27a-27c, as they are for example shown in FIG. 3. The reading light switches 27a-27c are electrically coupled with the personal reading light units 12a, 12b, in order to allow passengers, which are sitting on the passenger seats 81, to selectively activate and deactivate the respectively associated personal reading light units 12a, 12b of the at least one aircraft passenger cabin light 2.

The reading light switches 27a-27c may be mechanical switches, which are configured to be manually operated by the passengers. The reading light switches 27a-27c also may be electromagnetic switches, such as relays, and/or electronic switches, such as semiconductor switches, which are configured to be switched by electric control signals supplied to the switches.

The reading light switches 27a-27c may also comprise virtual switching elements, which are displayed on a screen, in particular a touch screen, and which may be operated by tapping on the screen.

The reading light switches 27a-27c may be provided as components of a passenger service unit 109a-109d, as it is depicted in FIG. 3. In alternative embodiments, which are not explicitly depicted in the Figures, the reading light switches 27a-27c may be provided as components of different passenger service units provided at the passenger seats 81, for example in the arm rests 82 of the passenger seats 81. In further embodiments, the reading light switches 27a-27c may be provided at or in the vicinity of the passenger seats 81, without being integrated in any passenger service unit.

In an aircraft passenger cabin lighting system according to an exemplary embodiment of the invention, each seat row 80a-80d is assigned to a group of personal reading light units 12a, 12b, and each passenger seat 81 within said seat row 80a-80d is assigned to one of the personal reading light units 12a, 12b of said group of personal reading light units 12a, 12b.

Each of the reading light switches 27a-27c is assigned to one of the passenger seats 81 within said seat row 80a-80d, respectively. The reading light switches 27a-27c and the personal reading light units 12a, 12b are functionally coupled to each other, so that the particular personal reading light unit that is assigned to a particular passenger seat is switchable by operating the particular reading light switch which is assigned to said particular passenger seat.

Said coupling between the reading light switches 27a-27c and the personal reading light units 12a, 12b allows each passenger to activate and deactivate his/her respective personal reading light illumination by operating the particular reading light switch that is assigned to his/her passenger seat 81, respectively.

In order to allow for easily adapting the illumination of the passenger cabin 104, in particular the personal reading light illumination that is provided by the personal reading light units 12a, 12b, to different seat configurations within the passenger cabin 104, the number of personal reading light units 12a, 12b of the aircraft passenger cabin lighting system may be larger than the number of passenger seats 81 within the passenger cabin 104.

The number of groups of personal reading light units 12a, 12b may in particular be larger than the number of seat rows 80a-80d.

In an embodiment, in which the number of personal reading light units 12a, 12b of the aircraft passenger cabin lighting system is larger than the number of passenger seats 81 within the passenger cabin 104, not all, but only a selected subset of the plurality of personal reading light units 12a, 12b are coupled with a reading light switch 27a-27c, which allows for selectively activating and deactivating the respective personal reading light unit 12a, 12b. The personal reading light units 12a, 12b, which are not coupled to one of the reading light switches 27a-27c, are deactivated.

In such an embodiment, the personal reading light illumination, which is provided by the personal reading light units 12a, 12b of the aircraft passenger cabin light 2, may be adjusted easily to a new seat configuration, when the seat configuration within the passenger cabin 104 is changed. The illumination provided by the personal reading light units 12a, 12b may in particular be adjusted by changing the coupling between the reading light switches 27a-27c and the personal reading light units 12a, 12b, without physically moving, changing or modifying the aircraft passenger cabin light 2 and/or the personal reading light units 12a, 12b.

In an embodiment, the coupling between the reading light switches 27a-27c and the personal reading light units 12a, 12b may be adjusted manually by modifying the electrical connections between the reading light switches 27a-27c and the personal reading light units 12a, 12b. The aircraft passenger cabin lighting system may, for example, comprise configuration switches, which allow for modifying the electrical connections between the reading light switches 27a-27c and the personal reading light units 12a, 12b by manually switching said configuration switches.

In an embodiment, the aircraft passenger cabin lighting system may comprise a controller 32 (see FIG. 5), which is configured for controlling the coupling between the plurality of reading light switches 27a-27c and the personal reading light units 12a, 12b. The controller 32 may be re-configurable, in order to allow for different associations between the plurality of reading light switches 27a-27c and personal reading light units 12a, 12b. Said different associations may be adapted to different seat configurations within the aircraft passenger cabin 104.

Such a controller 32 may allow for modifying the assignments between the plurality of reading light switches 27a-27c and the personal reading light units 12a, 12b easily by re-configuring the controller 32. In a configuration comprising such a controller 32, there is in particular no need for manually amending the physical connections between the reading light switches 27a-27c and the personal reading light units 12a, 12b. In consequence, the assignment between the plurality of reading light switches 27a-27c and the personal reading light units 12a, 12b may be adapted even more conveniently to a new configuration of the passenger seats 81.

A plurality of seat configurations and respectively associated assignments between the plurality of reading light switches 27a-27c and the personal reading light units 12a, 12b may be stored within the controller 32. When one of said seat configurations is realized within the passenger cabin 104, the corresponding assignment, which is stored within the controller 32, may be retrieved and implemented.

The aircraft passenger cabin lighting system may comprise a single/central controller, which is configured for controlling all the couplings between the plurality of reading light switches 27a-27c and personal reading light units 12a, 12b, which are present within the aircraft passenger cabin 104.

In an alternative embodiment, the aircraft passenger cabin lighting system may comprise a plurality of decentralized controllers 32. In such an embodiment, each controller 32 may be configured for controlling the couplings between a selected subgroup of reading light switches 27a-27c and a selected subgroup of personal reading light units 12a, 12b within the passenger cabin 104, respectively.

A separate controller 32 may, for example, be provided in each of the passenger service units 109a-109d for coupling the reading light switches 27a-27c of the respective passenger service unit 109a-109d with corresponding personal reading light units 12a, 12b.

Alternatively, a separate controller 32 may be provided in each of a plurality of aircraft passenger cabin lights 2, and each of the controllers 32 may be configured for assigning reading light switches 27a-27c to the personal reading light units 12a, 12b of the respective aircraft passenger cabin light 2.

In an embodiment, which comprises a plurality of controllers 32, each controller 32 may comprise an interface 34, which allows for connecting the controllers to each other, in order to allow the controllers to communicate with each other.

The interface 34 may be a bus interface for coupling the controller 32 to an electric bus 36. The controllers 32 also may be coupled to each other via a wireless data connection, such as WLAN, Bluetooth, or a similar wireless data transmission protocol.

By communicating with each other, the controllers 32 may synchronize the assignments between the reading light switches 27a-27c and the personal reading light units 12a, 12b with each other. Such a synchronization may simplify the assignments between the reading light switches 27a-27c and the personal reading light units 12a, 12b even further. It may in particular simplify modifications of the assignment, which may be necessary when the seat configuration within the passenger cabin 104 is changed.

In an embodiment, which comprises a plurality of controllers 32, the controllers may include a master controller, which is configured for controlling and monitoring the operation of the other controllers, when the assignments between the reading light switches 27a-27c and the personal reading light units 12a, 12b are changed. In an embodiment, which includes a master controller 32, the assignments of all controllers may be changed by providing an input to only one of the controllers, namely to the master controller.

The master controller may be one of the controllers 32, which are provided in the passenger service units 109a-109d, or one of the controllers 32 provided in the plurality of aircraft passenger cabin lights 2, which has been selected and set-up as the master controller.

Alternatively, the master controller may be an additional controller, which is provided in addition to the controllers 32 provided in the passenger service units 109a-109d and/or the controllers 32 provided in the plurality of aircraft passenger cabin lights 2.

The master controller may in particular be a mobile controller, which may be provided as a handheld device, and which is coupled to at least one of the other controllers 32 of the aircraft passenger cabin lighting system only temporarily for changing the assignments between the reading light switches 27a-27c and the personal reading light units 12a, 12b, when the seat configuration within the passenger cabin 104 is changed.

The master controller may be coupled to at least one other controller via a cable connection, in particular via a plug and a corresponding socket.

The master controller also may be coupled to the at least one other controller via a wireless data connection, such as WLAN, Bluetooth, or a similar wireless data transmission protocol, in order to allow for a very easy and convenient modification of the assignments between the reading light switches 27a-27c and the personal reading light units 12a, 12b.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft passenger cabin light having an elongated shape with a longitudinal direction (L), the aircraft passenger cabin light comprising:
   a cabin wall illumination assembly, which extends along the longitudinal direction (L) of the aircraft passenger cabin light and which is configured for illuminating a portion of a wall of an aircraft passenger cabin; and
   a plurality of personal reading light units for providing personal reading light illumination to passengers, wherein the plurality of personal reading light units are arranged in an array extending along the longitudinal direction (L) of the aircraft passenger cabin light, with said array being arranged along the cabin wall illumination assembly; wherein the cabin wall illumination assembly comprises a plurality of cabin wall illumination light sources; wherein the plurality of personal reading light units comprise a plurality of reading light sources; wherein the plurality of cabin wall illumination light sources and the plurality of reading light sources are arranged on a common circuit board in an array extending along the longitudinal direction (L) of the aircraft passenger cabin light.

2. The aircraft passenger cabin light according to claim 1, wherein the plurality of personal reading light units are arranged in groups of personal reading light units, wherein each group of personal reading light units comprises at least two personal reading light units and wherein the groups of personal reading light units are spaced apart from each other along the longitudinal direction (L) of the aircraft passenger cabin light.

3. The aircraft passenger cabin light according to claim 1, wherein the cabin wall illumination assembly comprises at least one reflector, which extends along the longitudinal direction (L) of the aircraft passenger cabin light.

4. The aircraft passenger cabin light according to claim 1,
   wherein the aircraft passenger cabin light has a longitudinal extension and a transverse extension, wherein the transverse extension is smaller than the longitudinal extension; and
   wherein the transverse extension is in particular smaller than 30% of the longitudinal extension.

5. The aircraft passenger cabin light according to claim 1,
wherein the cabin wall illumination assembly and the plurality of personal reading light units are arranged in a common elongated housing of the aircraft passenger cabin light; and
wherein the common elongated housing includes in particular an at least partially light transmissive cover.

6. The aircraft passenger cabin light according to claim 1, wherein the aircraft passenger cabin light further comprises at least one selectively illuminable visual sign.

7. The aircraft passenger cabin light according to claim 6, wherein the at least one selectively illuminable visual sign is one of: a switch-off-your-electronic-devices sign, a non-smoking sign, a fasten-your-seatbelt sign, and a fold-up-your-table sign.

8. An aircraft passenger cabin lighting system, comprising:
an aircraft passenger cabin light according to claim 1; and
a plurality of reading light switches, wherein each of the plurality of reading light switches is coupled with a particular one of the plurality of personal reading light units, with the plurality of reading light switches controlling the operation of a selected subset of the plurality of personal reading light units.

9. The aircraft passenger cabin lighting system according to claim 8, wherein each of the plurality of reading light switches is assigned to a particular passenger seat and is coupled with that particular personal reading light unit which is arranged for providing illumination to the particular passenger seat.

10. The aircraft passenger cabin lighting system according to claim 8, further comprising:
a controller, which couples the plurality of reading light switches to particular personal reading light units,
wherein the controller is in particular re-configurable, in order to allow for adapting the association between the plurality of reading light switches and particular personal reading light units.

11. The aircraft passenger cabin lighting system according to claim 10, wherein the controller comprises an interface for coupling the controller with another external controller, in particular with a master controller, wherein the interface is in particular an interface for wireless connection or a bus interface for coupling the controller to an electric bus.

12. The aircraft passenger cabin lighting system according to claim 8, further comprising:
at least one passenger service unit;
wherein the plurality of reading light switches and/or the controller are components of the at least one passenger service unit.

13. The aircraft passenger cabin lighting system according to claim 12,
wherein each of the at least one passenger service unit further comprises:
at least one of a loudspeaker, a gasper, an emergency passenger oxygen supply system, a selectively illuminable visual sign, or a cabin service personnel switch for triggering a signal for calling cabin service personnel.

14. An aircraft comprising:
an aircraft passenger cabin, comprising at least one aircraft passenger cabin wall and housing a plurality of passenger seats; and
at least one aircraft passenger lighting system according to claim 8;
wherein the aircraft passenger cabin light of each of the at least one aircraft passenger lighting system is arranged along a particular one of the at least one aircraft passenger cabin wall.

15. An aircraft according to claim 14,
wherein the plurality of passenger seats are arranged in passenger seat rows, which extend in a transverse direction (T) of the aircraft passenger cabin,
wherein the passenger seat rows are spaced apart from each other along a longitudinal direction (L) of the aircraft passenger cabin, and
wherein the cabin wall illumination assembly of the aircraft passenger cabin light extends along a plurality of seat rows in the longitudinal direction (L) of the aircraft passenger cabin.

16. An aircraft according to claim 14, further comprising a plurality of passenger service units;
wherein the plurality of passenger seats are arranged in passenger seat rows;
wherein a respective passenger service unit is arranged next to, in particular above, each of the passenger seat rows, and
wherein each of the passenger service units comprises reading light switches for switching the particular personal reading light units, which provide personal reading light illumination to passenger seats arranged next to or below, the respective passenger service unit.

17. A method of installing an aircraft passenger cabin lighting system according to claim 8, in an aircraft passenger cabin, wherein the method includes:
installing the aircraft passenger cabin light of the aircraft passenger cabin lighting system within the aircraft passenger cabin, so that the cabin wall illumination assembly extends along a longitudinal direction (L) of the aircraft passenger cabin;
installing at least one reading light switch at, in particular above, at least one passenger seat in the aircraft passenger cabin;
coupling each of the at least one reading light switch with a particular one of the plurality of personal reading light units of the aircraft passenger cabin light.

* * * * *